US008023906B2

(12) United States Patent
Okumura

(10) Patent No.: US 8,023,906 B2
(45) Date of Patent: Sep. 20, 2011

(54) DIVERSITY RECEIVER AND METHOD FOR CONTROLLING DIVERSITY RECEIVING OPERATION

(75) Inventor: Yukihiko Okumura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 926 days.

(21) Appl. No.: 11/914,647

(22) PCT Filed: May 16, 2006

(86) PCT No.: PCT/JP2006/309704
§ 371 (c)(1),
(2), (4) Date: Jan. 8, 2008

(87) PCT Pub. No.: WO2006/123634
PCT Pub. Date: Nov. 23, 2006

(65) Prior Publication Data
US 2009/0233571 A1 Sep. 17, 2009

(30) Foreign Application Priority Data

May 17, 2005 (JP) ................... 2005-144635

(51) Int. Cl.
H04B 1/02 (2006.01)
(52) U.S. Cl. .................... 455/101; 455/277.2; 455/562.1
(58) Field of Classification Search .................. 455/101, 455/277.1–277.2, 272, 562.1, 226.1–226.4
See application file for complete search history.

(56) References Cited

U.S. PATENT DOCUMENTS

| 6,594,241 B1* | 7/2003 | Malmlof ................... 370/329 |
| 7,925,302 B2* | 4/2011 | Ulupinar et al. ........... 455/562.1 |
| 2003/0153358 A1* | 8/2003 | Moon et al. ................ 455/562.1 |
| 2005/0197080 A1* | 9/2005 | Ulupinar et al. ........... 455/277.2 |

FOREIGN PATENT DOCUMENTS

| JP | 5 91012 | 4/1993 |
| JP | 7 123037 | 5/1995 |
| JP | 7 273705 | 10/1995 |
| JP | 2000 252896 | 9/2000 |
| JP | 2001 44924 | 2/2001 |
| JP | 2001 186069 | 7/2001 |
| JP | 2002 246969 | 8/2002 |
| JP | 2002 300096 | 10/2002 |
| JP | 3433503 | 5/2003 |
| WO | WO 2005/002111 A2 | 1/2005 |
| WO | WO 2005/002111 A3 | 1/2005 |

OTHER PUBLICATIONS

Office Action issued Oct. 5, 2010, in Japan Patent Application No. 2005-144635 (with English translation).

* cited by examiner

Primary Examiner — Lana Le
(74) Attorney, Agent, or Firm — Oblon, Spivak, McClelland, Maier & Neustadt, L.L.P.

(57) ABSTRACT

Power consumption is reduced in a diversity receiver. A diversity receiver (10) comprises a condition determination circuit (26) determining whether a predefined condition is satisfied; and a control circuit (28) suspending diversity reception if the condition determination circuit determines that the predefined condition is satisfied.

4 Claims, 4 Drawing Sheets

DIVERSITY RECEIVER AND METHOD FOR CONTROLLING DIVERSITY RECEIVING OPERATION

TECHNICAL FIELD

The present invention relates to a diversity receiver and a control method for diversity receiving operations, and more specifically, the present invention relates to a diversity receiver and a control method for diversity receiving operations in a mobile station for radio communications to a base station in a mobile communication system.

BACKGROUND ART

In radio transmission where transmitted signals from a transmitter are received at a receiver, amplitude and phase of the received signals vary over time due to Rayleigh fading involved in variations in relative positions between the transmitter and the receiver under a mobile communications environment where either or both of the transmitter and the receiver may move. In demodulation (recovering of transmitted signals) of the varying received signals in the receiver, sometimes the demodulation cannot be successfully carried out for amplitude decreasing intervals.

Among techniques for suppressing the effect of such fading variations, there is an antenna space diversity technique employing multiple antennas in a receiver, although a single antenna is commonly employed. According to the antenna space diversity technique, respective frame phases (timings) of received signals supplied from the multiple antennas are synchronized, and then the received signals are combined. By demodulating the combined received signals, the fading effect can be reduced compared to the single antenna case. In a case of two antennas, for example, if a signal received via one antenna has an insufficient level and on the other hand, a signal received via the other antenna has a sufficiently high level, level reduction can be alleviated by combining the signals received via the two antennas. Note that correlation between multiple antennas must be suppressed as much as possible for enhancing the combination effect. In addition, the combination may be carried out after weighting signals received via the respective antennas with their amplitudes. Instead of the combination of signals received via the respective antennas, a single output from an antenna having a high average level may be selected and provided.

DISCLOSURE OF INVENTION

Problem to be Solved by the Invention

If the above-mentioned antenna space diversity technique is applied to mobile communications and others, it is easily applicable to a base station (fixed station) capable of obtaining a stable power source. On the other hand, the application of the technique to a cellular phone terminal (mobile station) has a problem that power consumption of radio frequency reception circuits and others increases compared to the case of a single antenna, resulting in reduced continuous talking time without recharging.

Means for Solving the Problem

A diversity receiver according to one aspect of the present invention includes:

a condition determination circuit determining whether a predefined condition is satisfied; and a control circuit suspending diversity reception if the condition determination circuit determines that the predefined condition is satisfied.

According to this aspect of the invention, consumed power can be reduced by suspending diversity reception that may cause power consumption in a radio frequency reception circuit and others.

In an embodiment of the present invention, the diversity receiver may receive a signal from a base station at a mobile station, and the predefined condition may comprise the quality of a predefined signal from a calling base station being higher than a threshold.

According to this embodiment, consumed power can be reduced by suspending the diversity reception when the quality of a predefined signal from a communicating base station becomes higher than a threshold.

In an embodiment of the present invention, the diversity receiver may receive a signal from a base station in a mobile station, and the predefined condition may comprise a level of a signal transmitted to a base station in the mobile station being lower than a threshold.

According to this embodiment, consumed power can be reduced by suspending the diversity reception when a level of a signal transmitted to a base station in the mobile station becomes lower than a threshold.

In an embodiment of the present invention, the predefined condition may comprise the diversity receiver communicating via a transmission power control applied channel.

According to this embodiment, consumed power can be reduced by suspending the diversity reception when the diversity receiver is communicating via a transmission power control applied channel.

In an embodiment of the present invention, the diversity receiver may receive a signal from a base station in a mobile station, and the predefined condition may comprise the diversity receiver communicating via a common channel and level of a signal transmitted to a base station in the mobile station being lower than a threshold.

In an embodiment of the present invention, the predefined condition may comprise movement speed of the diversity receiver being lower than a predefined value.

According to these embodiments, consumed power can be reduced by suspending the diversity reception when the predefined condition is satisfied.

In an embodiment of the present invention, the predefined condition may comprise the movement speed being lower than a predefined first value during the diversity receiver communicating via a transmission power control applied channel and the movement speed being lower than a predefined second value and the predefined first value being greater than the predefined second value during the diversity receiver communicating via a transmission power control non-applied channel.

According to this embodiment, consumed power can be reduced by suspending the diversity reception.

In an embodiment of the present invention, a diversity receiving operation may be enabled for only a predefined short duration during suspension of the diversity receiving operation.

According to this embodiment, consumed power can be reduced by enabling the diversity reception for only a short duration and suspending it for another duration.

In another aspect of the present invention, a method of controlling a diversity receiving operation in a diversity receiver includes the steps of:

determining whether a predefined condition is satisfied; and suspending diversity reception if it is determined that the predefined condition is satisfied.

According to this aspect of the invention, consumed power can be reduced by suspending the diversity reception that may cause power consumption for a radio frequency reception circuit and others.

In an embodiment of the present invention, the predefined condition may comprise quality of a predefined signal from a communicating base station being higher than a threshold.

According to this embodiment, consumed power can be reduced by suspending the diversity reception when quality of a predefined signal from a communicating base station becomes higher than a threshold.

In an embodiment of the present invention, the predefined condition may comprise level of a transmitted signal in an uplink in the diversity receiver being lower than a threshold.

According to this embodiment, consumed power can be reduced by suspending the diversity reception when level of a transmitted signal in an uplink in the diversity receiver becomes lower than a threshold.

In an embodiment of the present invention, the predefined condition may comprise the diversity receiver communicating via a transmission power control applied channel.

According to this embodiment, consumed power can be reduced by suspending the diversity reception when the diversity receiver is communicating via a transmission power control applied channel.

In an embodiment of the present invention, the diversity receiver may receive a signal from a base station in a mobile station, and the predefined condition may comprise the diversity receiver communicating via a common channel and level of a signal transmitted to a base station in the mobile station being lower than a threshold.

In an embodiment of the present invention, the predefined condition may comprise movement speed of the diversity receiver being lower than a predefined value.

According to these embodiments, consumed power can be reduced by suspending the diversity reception when the predefined condition is satisfied.

In an embodiment of the present invention, the predefined condition may comprise the movement speed being lower than a predefined first value during the diversity receiver communicating via a transmission power control applied channel and the movement speed being lower than a predefined second value and the predefined first value being greater than the predefined second value during the diversity receiver communicating via a transmission power control non-applied channel.

According to these embodiments, consumed power can be reduced by suspending the diversity reception.

In an embodiment of the present invention, a diversity receiving operation may be enabled for only a predefined short duration during suspension of the diversity receiving operation.

According to this embodiment, consumed power can be reduced by enabling the diversity reception for only a short duration and suspending it for another duration.

Advantage of the Invention

According to the embodiments of the present invention, the diversity receiving operation is suspended in an antenna space diversity receiver based on determination as to the level of a predefined determination target signal. Thereby, increase in consumed current caused by the diversity receiving operation can be suppressed, and thus communication quality is kept better during movement while preventing a decrease in continuous talking time.

LIST OF REFERENCE SYMBOLS

Figure 1:
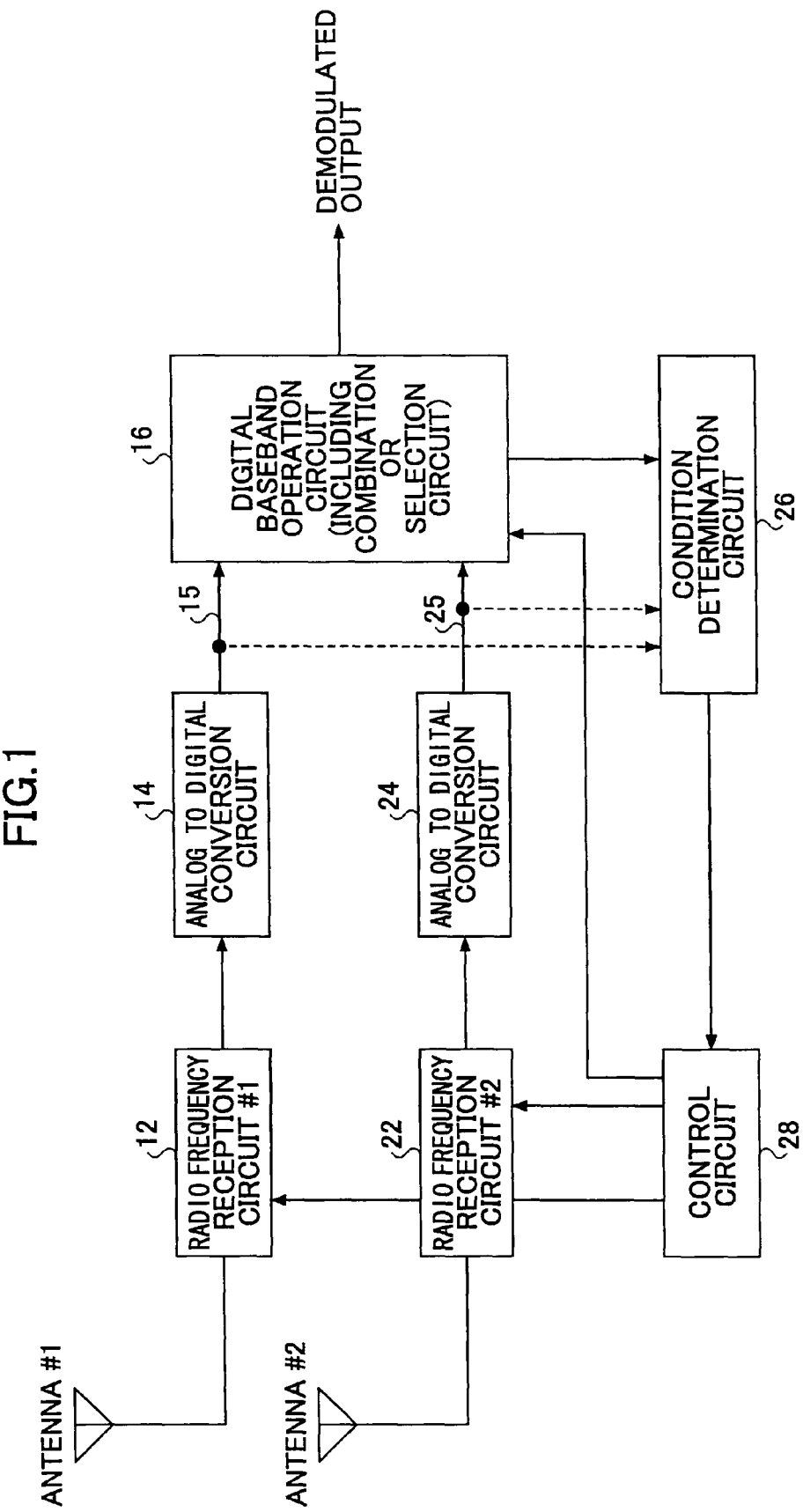
FIG. 1 is a block diagram illustrating an antenna space diversity receiver according to one embodiment of the present invention.

10: diversity receiver
12: radio frequency reception circuit
14: analog to digital conversion circuit
16: digital baseband operation circuit
22: radio frequency reception circuit
24: analog to digital conversion circuit
26: condition determination circuit
28: control circuit

BEST MODE FOR CARRYING OUT THE INVENTION

Embodiments of a diversity receiver and a diversity reception method according to the present invention will be described with reference to the accompanying drawings in detail below.

First Embodiment

FIG. 1 is a block diagram illustrating a portion of an antenna space diversity receiver according to a first embodiment of the present invention. In FIG. 1, a diversity receiver 10 including two antennas is illustrated for simplicity, but it may include three or more antennas. Antenna space diversity is one instance of diversity. Multiple antenna diversity may include several types of diversity such as space diversity where multiple antennas are arranged separately from each other at some distance, polarization diversity where multiple antennas are provided at approximately the same position and have different horizontal/vertical polarization planes with each other, and directional diversity where directivity is switched.

Signals received via an antenna #1 are supplied to a radio frequency reception circuit 12, and some signal processing such as signal amplification, frequency conversion and filtering is carried out in the radio frequency reception circuit 12 if needed. Outgoing signals are converted into digital signals in an analog to digital conversion circuit 14, and then the resulting signals are supplied to a digital baseband operation circuit 16.

On the other hand, signals received via an antenna #2 are supplied to a radio frequency reception circuit 22, and some signal processing such as signal amplification, frequency conversion and filtering are carried out in the radio frequency reception circuit 22 if needed. Outgoing signals are converted into digital signals in an analog to digital conversion circuit 24, and then the resulting signals are supplied to the digital baseband operation circuit 16.

Also in cases of three or more antennas, the above-mentioned operations are performed in parallel, and the resulting signals are supplied to the digital baseband operation circuit 16.

In operation, the digital baseband operation circuit 16 combines two incoming signals 15 and 25 or selects one of the two signals 15 and 25, and supplies the resulting demodulated signal combined or selected in the digital baseband operation circuit 16. The demodulated signal from the digital baseband operation circuit 16 is supplied to a subsequent signal processing stage (not illustrated) as well as to a condition determination circuit 26.

Figure 2:
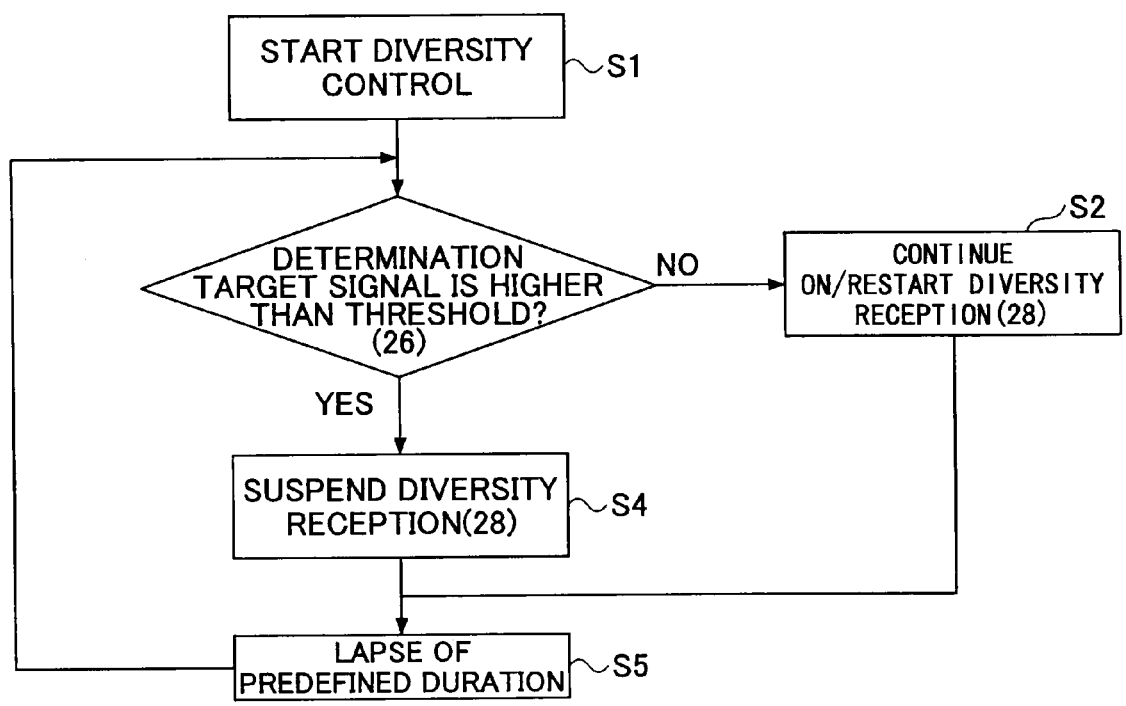
FIG. 2 is a flowchart illustrating a procedure for controlling a diversity receiving operation according to one embodiment of the present invention.

As illustrated in FIG. 2, at step S2, the condition determination circuit 26 checks whether a predefined determination target signal in a received signal, that is, a signal to be determined (e.g., level, quality and other factors of a pilot signal) is higher than a predefined threshold in order to determine whether diversity receiving operations should be kept or suspended, and provides a control circuit 28 with the determination result.

For example, the determination target signal may include the signal level or signal quality of a pilot channel. More specifically, various target signals such as signal level (power, field intensity and others), S/N, C/N and error rate may be considered. In addition, as stated below, the determination target signal may include various signals such as a signal indicative of uplink transmission signal level, a signal indicative of movement speed of the relevant receiver, and a signal indicative of whether communications are being carried out via a transmission power control applied channel.

The condition determination circuit 26 may receive the demodulated signal combined or selected in the digital baseband operation circuit 16 or receive the digital signals 15 and 25 from the analog to digital conversion circuits 14 and 24 directly. In the latter case, both digital signals may be separately compared to a threshold. Alternatively, the digital signals may be compared to each other to determine which of them is higher. In one variation, the condition determination circuit 26 may be included in the digital baseband operation circuit 16.

The determination target signal received at the condition determination circuit 26 may comprise a combination result of the communication channel. Note that if the previous condition determination relates to diversity reception suspension, output signals of the combination circuit may correspond to input signals of the combination circuit. Alternatively, the determination target signal may comprise a combination result of a communication channel and a pilot channel transmitted in parallel or time multiplexed with the communication channel.

In general, if a receiver is in good transmission and reception condition, the receiver is able to reduce the level of uplink transmission signals. Thus, if the level of uplink transmission signals is less than or equal to a predefined threshold, the receiver can be configured to suspend diversity reception. In this configuration, the condition determination circuit 26 can determine whether the level of the uplink transmission signal is less than or equal to the threshold by obtaining the level of uplink transmission signal in its own station as a determination target signal.

Channels may be classified into common channels (control related channel) and dedicated channels (talk and others). In general, the dedicated channels are subject to transmission power control, whereas the common channels are not subject to it. Thus, the common channels, which are not subject to the transmission power control, may have greater diversity reception effect. For this reason, the diversity may be switched on/off depending on the type of channel without comparison of communication quality between multiple antennas.

As exemplary simple control, the diversity reception may be enabled during communication via a transmission power control non-applied channel (common channel) such as a transmission channel for location registration signals, whereas the diversity reception may be disabled during communication via a transmission power control applied channel (dedicated channel).

According to such a configuration, the condition determination circuit 26 can determine signals indicative of whether communications are being carried out via transmission power control applied channels as determination target signals.

More specifically, under communicating conditions for common channels, transmission power control is not applied to the downlink whereas (slow or moderate) transmission power control is applied to the uplink. Thereby, the average level (or the peak level) of transmission power of a mobile station may be relatively low at a location relatively close to a base station or in intervals of good communication environment. Thus, even if the diversity reception is temporarily disabled in those intervals (that can be determined in the threshold determination of transmission power), the communication quality is hardly affected.

On the other hand, under communicating conditions for dedicated channels, fast transmission power control is applied to both of the downlink and the uplink. Thereby, the diversity reception can be temporarily disabled based on the transmission power of a mobile station. Note that different transmission power control methods may be applied. Thus, more proper control is achieved by setting the threshold used to control suspension of the diversity reception to be different values for the common channel condition and the dedicated channel condition.

In addition, slower movement speed of a receiver leads to a greater space diversity reception effect. Thus, if the movement speed of a receiver is lower than a predefined value, the diversity reception may be enabled, and otherwise, the diversity reception may be disabled. The receiver's movement speed can be detected by using fading frequency, an acceleration sensor and a GPS system. Upon receiving some information as a determination target signal from a fading frequency detection circuit, an acceleration sensor, a GPS system or others (not illustrated), the condition determination circuit 26 can determine whether the receiver's movement speed is lower than a predefined value.

Alternatively, when a stationary mobile station begins to move fast at an increasing movement speed, communication channels, particularly transmission power control non-applied channels generally tend to have degraded quality. Hence, even if the reception diversity receiving operation is suspended at less than a predefined speed in the transmission power control non-applied common channels (downlink), the quality may not be degraded so much. As a result, it is possible to reduce consumed power while maintaining required communication quality.

For transmission power control applied channels, on the other hand, a speed threshold for triggering the diversity reception operation, that is, a value above which the reception diversity receiving operation is triggered, can be set to be higher such that once a mobile station moves fast enough to make the application of the transmission power control ineffective, the reception diversity receiving operation is triggered.

Also, the diversity reception may be suspended if the movement speed of a mobile station falls below a predefined first value during the mobile station communicating via transmission power control applied channels and/or if the movement speed falls below a predefined second value (the predefined first value is greater than the predefined second value) during the mobile station communicating via transmission power control non-applied channels.

In this control, reception quality of respective antennas may strictly vary over time even in slow movement or a stationary condition. Thus, the diversity receiving operation may not be disabled continuously but may be periodically enabled in short durations even during the suspension (or may be made a selective diversity receiving operation).

The control circuit 28 may control to operate only one line or both lines of a radio frequency reception circuit based on incoming determination results. More specifically, the control circuit 28 may control to operate only the radio frequency reception circuit 12, only the radio frequency reception circuit 22 (which line(s) are to operate in case of three or more lines) or both of them. Furthermore, the control circuit 28 may control combinations within a baseband operation circuit or operation of a selection circuit based on incoming determination results.

If the level or quality of signals (e.g., pilot channels) from a calling base station is less than or equal to a predefined threshold, the control circuit 28 enables both of the radio frequency reception circuits 12 and 14 due to a substantial need for the diversity reception (S3 in FIG. 2). Note that the level or the quality is simply referred to as "quality" throughout this specification and claims and the "quality" may include level (power, field intensity and others), S/N, C/N, error rate and others.

On the other hand, if the quality of signals (e.g., pilot channels) from a calling base station is greater than or equal to the predefined threshold, the control circuit 28 may temporarily disable the diversity reception by temporarily disabling any of the radio frequency reception circuits (S4 in FIG. 2).

Instead of the above-mentioned quality or others of received signals, whether the diversity reception should remain enabled or disabled may be controlled based on other factors.

In general, if transmission and reception within a receiver are in good condition, the level of signals transmitted in the uplink is reduced. Thus, if the level of signals transmitted in the uplink is less than or equal to a predefined threshold, the diversity reception can be suspended.

In addition, common channels not subject to transmission power control may have a greater effect of the diversity reception. Hence, the diversity reception may be suspended during communications via transmission power control applied channels without comparison of communication quality among multiple antennas.

Also, space diversity reception has a greater effect for slower movement speed of a receiver. Thus, if the movement speed of a receiver is less than a predefined value, the diversity reception may remain enabled, and otherwise, the diversity reception may be suspended. The movement speed of a receiver can be detected through fading frequency, an acceleration sensor and a GPS system.

In order to prevent frequent switching of diversity receiving operations based on condition determination results, a timer may be provided for counting time. The timer starts to count time at switching of receiving operations, and the next switching into another receiving operation may be prevented until the timer expires (S5 in FIG. 2 and S17 in FIG. 4).

After expiration of a predefined duration (S5), the control returns to the determination process for determining whether the level of the determination target signal is higher than a predefined threshold (S2).

In addition, reduced frequency is achieved by providing a hysteresis effect (not illustrated) suitable for the condition determination threshold instead of the timer.

Second Embodiment

Figure 3:
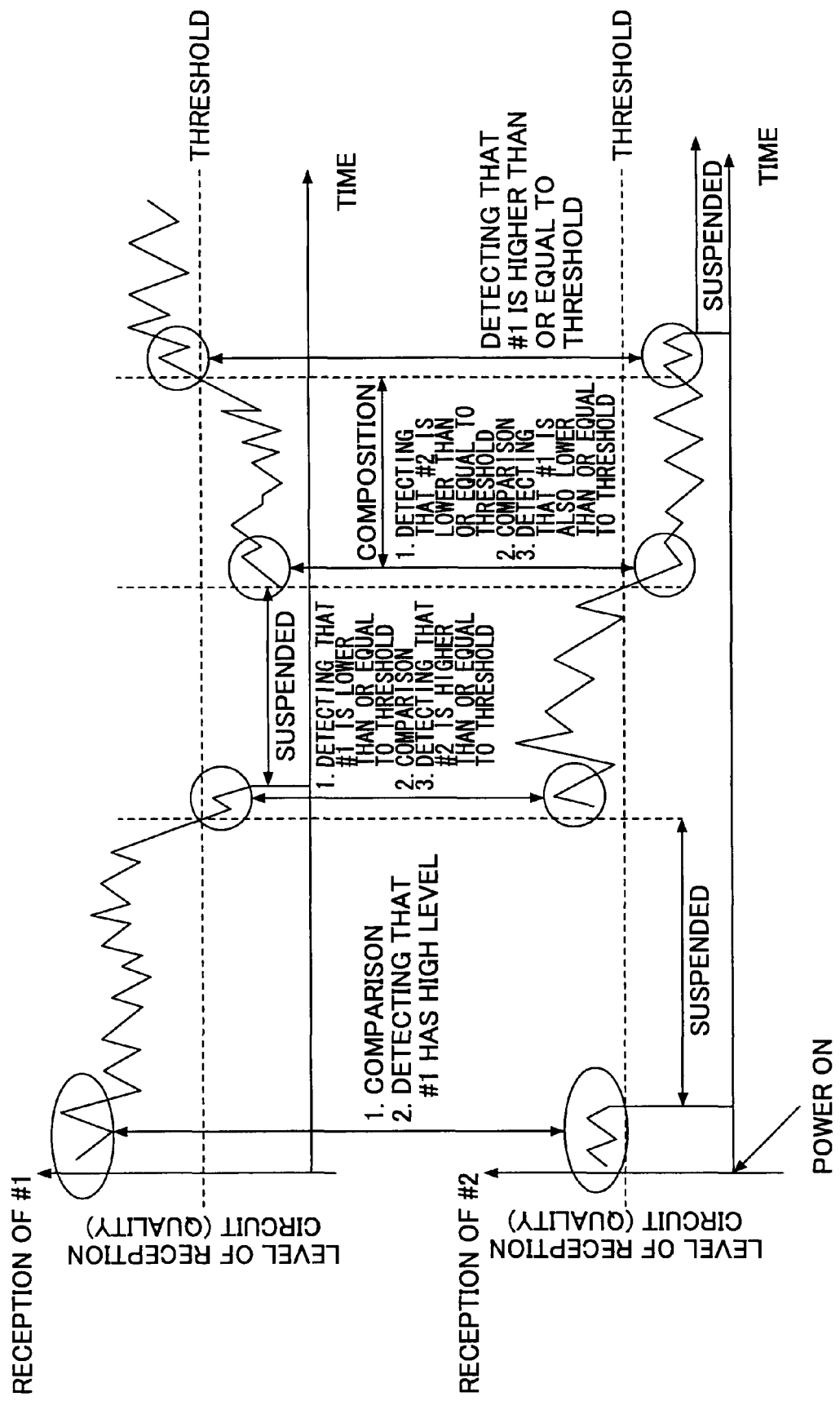
FIG. 3 is a timing chart illustrating conditions for controlling a diversity receiving operation according to another embodiment of the present invention.

Exemplary control operations for diversity receiving operations according to a second embodiment of the present invention will be described with reference to FIGS. 3 and 4 in detail below.

Figure 4:
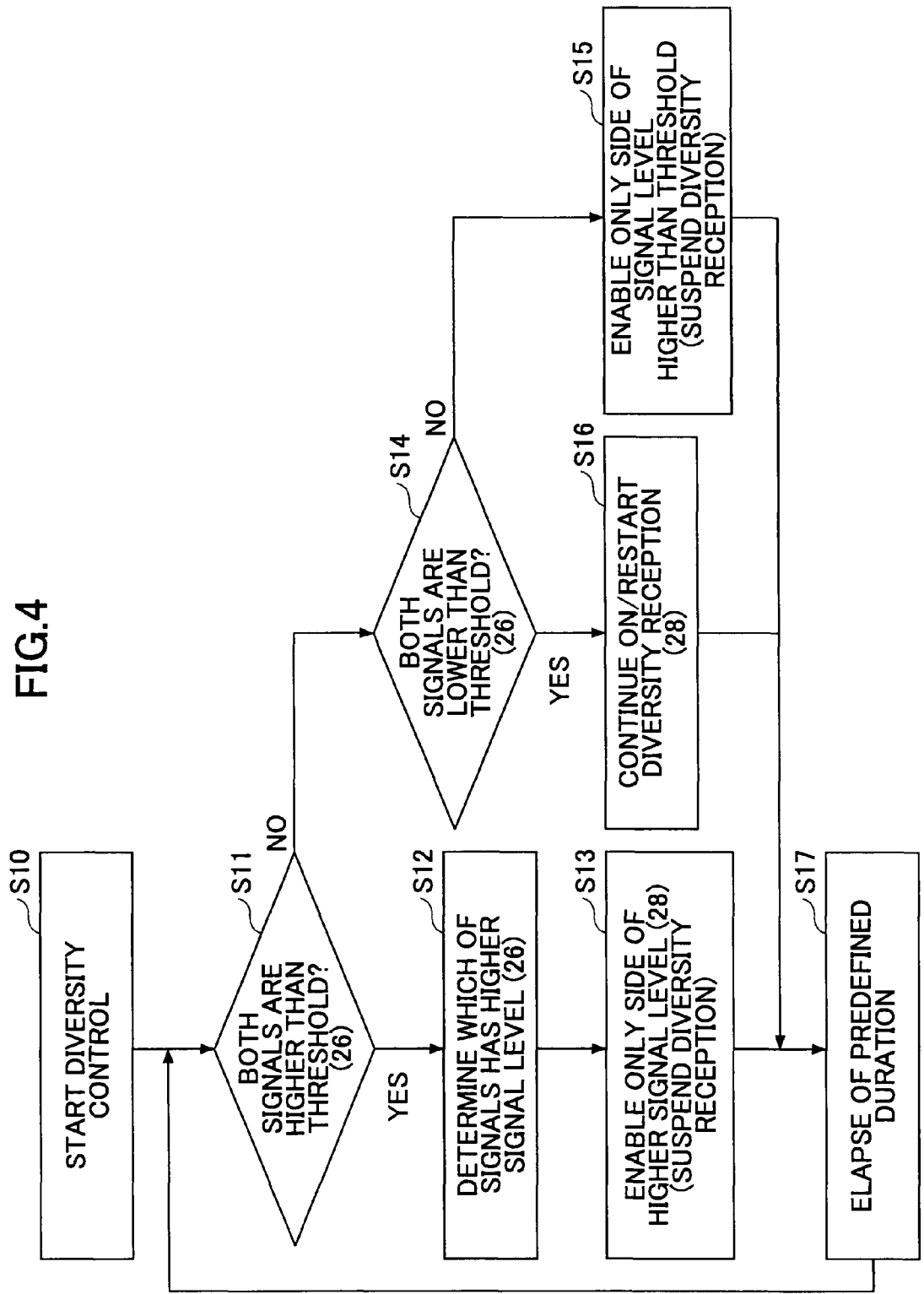
FIG. 4 is a flowchart illustrating a procedure for controlling a diversity receiving operation according to another embodiment of the present invention.

First, when the diversity receiver 10 is powered on, the condition determination circuit 26 determines whether the respective signals 14 and 25 have a threshold (S11 in FIG. 4), and detects one signal having a higher signal level in the two signals (S12 in FIG. 4).

If both of the signals have levels higher than the threshold, only a reception line corresponding to the signal having the higher signal level is selected, and the operation continues (S13 in FIG. 4). In the example in FIG. 3, the signal 15 from the radio frequency reception circuit 12 has the higher signal level. In this case, the radio frequency reception circuit 22 is disabled (suspension of the diversity reception), and only the radio frequency reception circuit 12 is enabled. In this manner, it is possible to reduce consumed power temporarily.

If only one of the signals has a level higher than the threshold (S14 in FIG. 4), only a reception line corresponding to the signal having the higher level is selected, and the operation continues (S15 in FIG. 4).

If both of the signals are less than or equal to the threshold (S14 in FIG. 4), both of the radio frequency reception circuits 12 and 22 are enabled, and the signals 15 and 25 are combined in the digital baseband operation circuit 16 (continuation of the diversity receiving operation, S16 in FIG. 4).

After expiration of a predefined duration (S17), the control returns to the determination process for determining whether both of the signals have levels higher than the threshold (S11).

Even after the diversity receiver 10 is powered on, the condition determination circuit 26 determines whether the respective signals 14 and 25 have signal levels higher than a threshold, and detects one signal having a higher signal level in the two signals.

If only one signal has a level higher than the threshold, only a reception line corresponding to the signal having the signal level higher than the threshold is selected, and the operation continues. In the example in FIG. 3, the signal 15 from the radio frequency reception circuit 12 has the higher signal level. In this case, the radio frequency reception circuit 22 is disabled (suspension of the diversity reception), and only the radio frequency reception circuit 12 remains enabled. In this manner, it is possible to reduce consumed power temporarily.

If both of the signals are less than or equal to the threshold, both of the radio frequency reception circuits 12 and 22 remain enabled, and the signals 15 and 25 are combined in the digital baseband operation circuit 16 (diversity receiving operation). In this case, the signals may be compared for selecting one signal having a higher signal level, and the operation may be carried out for the selected signal until the comparison to start the diversity receiving operation.

This international patent application is based on Japanese Priority Application No. 2005-144635 filed on May 17, 2005, the entire contents of which are hereby incorporated by reference.

The invention claimed is:

1. A diversity receiver, comprising:
   a condition determination circuit determining whether a predefined condition is satisfied; and
   a control circuit suspending diversity reception if the condition determination circuit determines that the predefined condition is satisfied,
   wherein the predefined condition comprises the movement speed being lower than a predefined first value during the diversity receiver communicating via a transmission power control applied channel and the movement speed being lower than a predefined second value and the predefined first value being greater than the predefined second value during the diversity receiver communicating via a transmission power control non-applied channel.

2. The diversity receiver as claimed in claim 1, wherein a diversity receiving operation is enabled for only a predefined short duration during suspension of the diversity receiving operation.

3. A method of controlling a diversity receiving operation in a diversity receiver, the method comprising the steps of:
   determining whether a predefined condition is satisfied; and
   suspending diversity reception if it is determined that the predefined condition is satisfied,
   wherein the predefined condition comprises the movement speed being lower than a predefined first value during the diversity receiver communicating via a transmission power control applied channel and the movement speed being lower than a predefined second value and the predefined first value being greater than the predefined second value during the diversity receiver communicating via a transmission power control non-applied channel.

4. The method as claimed in claim 3, wherein a diversity receiving operation is enabled for only a predefined short duration during suspension of the diversity receiving operation.

* * * * *